(No Model.)
R. B. MARKS.
WRENCH.
No. 364,765.  Patented June 14, 1887.
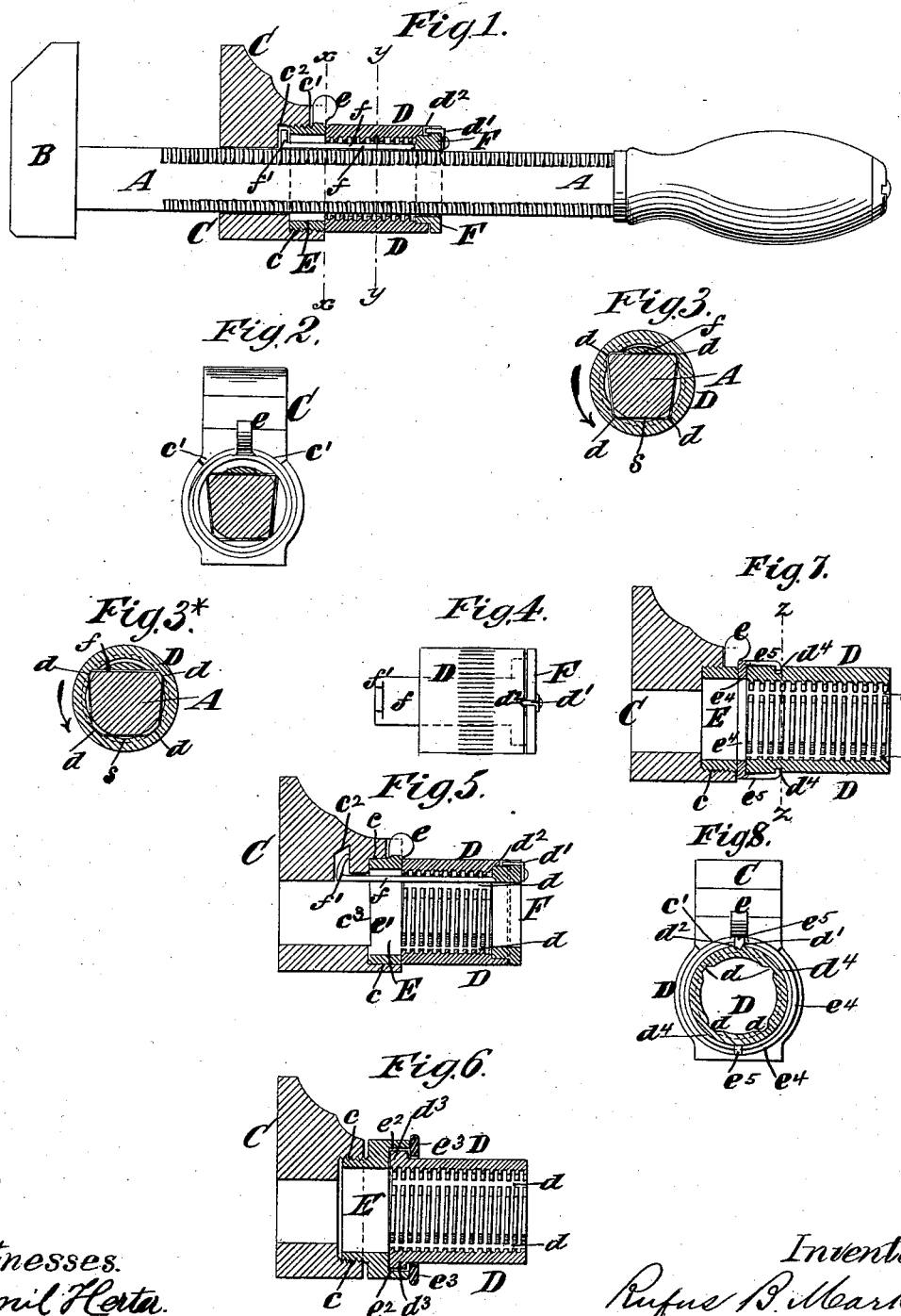
Witnesses
Emil Herta
C. L. Sundgren
Inventor:
Rufus B. Marks
by his Attys
Brown & Hall

UNITED STATES PATENT OFFICE.

RUFUS B. MARKS, OF NEWARK, NEW JERSEY.

WRENCH.

SPECIFICATION forming part of Letters Patent No. 364,765, dated June 14, 1887.

Application filed September 30, 1886. Serial No. 214,930. (No model.)

*To all whom it may concern:*

Be it known that I, RUFUS B. MARKS, of Newark, in the county of Essex and State of New Jersey, have invented a new and useful Improvement in Screw-Wrenches, of which the following is a specification.

My invention relates to screw-wrenches or monkey-wrenches in which the wrench-bar is of polygonal transverse section and has upon its corners portions of a screw-thread, and in which the nut, which is fitted to said bar for the purpose of adjusting the movable jaw, is grooved lengthwise upon its interior surface, so that when turned to proper position on the bar the nut, with the movable jaw, may be slid lengthwise of the bar, in order to quickly adjust the wrench to the size of the piece or nut which it is desired to grasp.

The invention consists in the combination, with a wrench-bar of trapezoidal transverse section, and the sides of which are therefore of unequal width and having portions of a screw-thread at the corners, of a movable jaw sliding thereon and a nut engaging the screw-threaded corners of the bar and grooved internally to permit the sliding of the nut when turned to proper position on the bar, the grooves of the nut being at unequal distances apart in its circumference corresponding to the arrangement of the sections of thread on the bar, whereby the nut will be free to slide upon the bar only when turned to one point in its rotation.

The invention also consists in the combination, with a wrench-bar of polygonal transverse section and having screw-threaded portions of unequal length at the several corners, of a movable jaw sliding thereon and a nut fitted to the screw-threaded corners of the bar and having internal longitudinal grooves which permit of the nut sliding on the bar when turned to proper position thereon, and which are of unequal widths corresponding to the unequal portions of thread at the several corners of the bar, whereby the nut is prevented from sliding on the bar except when at one position in its rotation. I also provide, in connection with the movable jaw and nut above described, an abutment or collar, against which the nut bears and which is adjustable by turning to vary the length of the movable jaw from its face to the point of bearing of the nut; and I prefer, also, to employ in connection with the nut a tooth or detent and notch, which will automatically be brought into engagement when the nut is turned to proper position for sliding it upon the bar and which will exert enough resistance to the turning of the nut to hold it against accidental turning when it is adjusted to the position in which it may slide along the bar, but not enough resistance to prevent the turning of the nut by hand.

The above and other features of construction and combination are included in my invention, which consists in novel combinations of parts and features of construction, hereinafter described, and pointed out in the claims.

In the accompanying drawings, Figure 1 is a sectional side view of a wrench embodying my invention. Fig. 2 is a transverse section upon the plane of the dotted line $x\,x$, Fig. 1. Fig. 3 is a similar section on the plane of the dotted line $y\,y$, Fig. 1. Fig. 3* is a view similar to Fig. 3, showing a slight modification of my invention. Fig. 4 is a plan of the rotary nut and the parts employed in connection therewith. Fig. 5 is an axial section of the movable jaw and nut connected according to a modification of my invention. Fig. 6 is an axial section of the movable jaw and nut connected according to another slight modification of my invention. Fig. 7 is an axial section similar to Fig. 5, showing another slight modification in my invention; and Fig. 8 is a transverse section on the plane of the dotted line $z\,z$, Fig. 7.

Similar letters of reference designate corresponding parts in all the figures.

A designates a wrench-bar, which has at the outer end a fixed jaw or head, B, and on which is fitted to slide freely a movable jaw, C, capable of adjustment along the bar by means of a nut, D. The bar A is polygonal in its transverse section, and has in the present example of my invention the form of a trapezoid in its transverse section, and for a purpose hereinafter described. The bar A has at its four corners portions of a screw-thread, and the nut D is internally threaded to engage with such portions of the screw-thread, in order to adjust the movable jaw C for gripping a nut or article between it and the fixed jaw B. The nut D has in its interior longitudinal grooves $d$, which, when the nut is adjusted by turning to the particular position shown in Fig. 3, coincide with and receive the portions of screw-thread at the four corners of the bar A and permit the nut D to be readily slid along the bar, carrying the movable jaw C with it.

In so far as some of the features of my invention are concerned the bar A might be rectangular in its transverse section; but it is obvious that if it were of such shape and the portions of screw-thread at the four corners were of equal length and the grooves in the nut of equal width, the nut would be released from the screw-thread of the bar and be free to slide when adjusted to any one of four points equidistant in its circumference. By making the bar A of trapezoidal form in transverse section I am enabled to form the grooves $d$ in the nut D at points which are not equidistant in the circumference of the nut, and when the bar and nut are of such construction and so combined together the nut will be free to slide upon the bar when adjusted to one point only. This is clearly proven by a careful consideration of Fig. 3, which shows the nut D turned to the position upon the bar A, in which it is free to slide thereon. From said figure it will be seen that the two corners of the bar A which are upon the side $s$ thereof are nearer together than the corners which bound any other side of the bar, and consequently the two grooves $d$ in the nut D, which are lowermost in Fig. 3, are nearer together than are any other of the grooves. For example, if the nut D be turned in the direction of the arrow indicated in Fig. 3 the grooves $d$ will not coincide with the thread portions of the bar again at any quarter-turn of the nut until the nut has been turned a full rotation and has been brought back to the position shown in Fig. 3, at which point it may be slid freely along the bar.

The engagement of the nut with the portions of screw-thread on the bar can be afforded additional security by making the length of the portions of screw-thread at the corners of the bar unequal and by making the grooves in the nut of unequal width. This feature is shown in Fig. 3*. As there shown, the portions of thread on the lower corners of the bar which bound the lower side, $s$, are of greater length than the portions of thread which are on the corners which bound the upper side of the bar, and the grooves $d$ in the nut D are of corresponding width. Now, it will be obvious from Fig. 3* that if the nut be turned the grooves of the nut will never coincide with the corners of the bar to which they correspond until the nut has made a complete turn from the position shown, and the nut will always engage with three corners of the bar at any quarter-turn in its complete rotation. The nut D might bear directly against the back of the movable jaw C; but in order to provide for increasing or diminishing the length of said movable jaw between its face and the bearing-point of the nut D, I prefer to arrange in the movable jaw a rotary abutment, E, against which the nut D bears, and which may be turned to vary the length of the movable jaw C from its face to the bearing-point of said nut. As shown in Fig. 1, the abutment E consists of a ring screw-threaded upon its exterior and screwed into a socket, $c$, in the movable jaw C. The abutment E is provided with a finger-piece, $e$, whereby it may be turned, and the movable jaw is notched, as shown at $c'$, in order to provide room for the swinging of the finger-piece $e$ in turning the abutment E. I have represented a collar, F, which is free to slide upon the wrench-bar A, and which is provided with an arm, $f$, lying along one flat side of the bar A, within the nut D, and having its end $f'$ upturned to engage the inner edge of the abutment E. The nut D is confined between the collar F and the abutment E, and as it is turned while in engagement with the threaded corners of the bar A the movable jaw C is advanced or retracted. When the wrench is to be adapted for nuts of considerable difference in size, the nut D is turned to the position shown in Fig. 3 relatively to the bar A, and it and the movable jaw are slid along the bar to bring them approximately to gripping position. It is of course possible that the relation of the nut to the thread of the bar A, when the movable jaw C comes to gripping position upon the nut or article, will be such that the necessary tightening of the nut and jaw will bring the nut D to the position shown in Fig. 3, leaving it free to slide along the bar A and deprive it of any function to grip the movable jaw C upon the article. To avoid this contingency I provide the abutment E, which in such case is turned slightly in the movable jaw, so as to necessitate turning the nut either backward or still farther forward, in order that it may properly exert its force upon the movable jaw C. It is desirable also to employ some gage which will automatically register when the nut is turned to proper position to slide upon the bar A, and which will exert a sufficient resistance on the nut, to hold it against accidental turning while being slid along the bar. As best shown in Fig. 4, and also in Fig. 1, a spring detent or tooth, $d'$, is secured to the collar F, and is adapted to engage a slight V-shaped notch, $d^2$, formed in the nut D. When the tooth $d'$ springs into the notch $d^2$, the person using the wrench will, by the resistance offered to the turning of the nut, know that the nut has been brought to proper position for sliding, and the tooth engaging the notch will hold the nut against accidental turning while being slid upon the bar. The tooth or detent $d'$ will not, however, oppose any amount of resistance which will interfere with the turning of the nut D, when it is desired to do so.

In the example of the invention shown in Fig. 1 the upwardly or outwardly turned end of the arm $f$ engages the inner edge of the ring or rotary abutment E, and is received in the notch $c^2$ formed in the movable jaw C. Inasmuch as the nut D and the rotary abutment E have both to be turned relatively to the bar A, they must be circular internally; but the movable jaw C and the collar F, which simply slide upon the bar, should have their internal cavities snugly fitted to the polygonal form of the bar.

The example of my invention shown in Fig. 5 differs from that above described only in having a rotary abutment, E, arranged to bear against the bottom of the recess or counterbore $c$ formed in the movable jaw C and provided on its inner edge with a cam-surface, $e'$, which bears upon a corresponding cam-surface, $c^3$, at the bottom of the recess or counterbore $c$. The abutment E has a hand-piece, $e$, whereby it may be turned, and when turned its outer edge, against which the nut D bears, will be moved relatively to the face of the jaw C, so as to increase or diminish the distance from the face of the jaw C to the bearing-point of the nut D. In this example of my invention the upwardly or outwardly turned portion $f'$ of the arm $f$ engages a notch or recess, $c^2$, in the movable jaw C, and the bent end portion is curved and bears upon the movable jaw at its extremity, as shown in Fig. 5, so as to give it a slight elasticity, sufficient to enable the nut D to yield outward when the rotary abutment E is turned to increase the length of the movable jaw C from its face to the bearing-point of the nut D.

In the example of my invention shown in Fig. 6 the rotary abutment E, against which the nut D bears, is screwed into a screw-threaded socket, $c$, in the movable jaw C, as described with reference to Fig. 1, and has itself a recess or counterbore, $e^2$, which receives a flange, $d^3$, on the nut D, and is covered by a ring or plate, which serves to hold the nut D to the rotary abutment E, while permitting it to turn relatively to said abutment.

The example of my invention shown in Figs. 7 and 8, differs but slightly from that shown in Fig. 6. In Figs. 7 and 8 the rotary abutment has applied to it a ring or flange, $e^4$, having bent or angular arms $e^5$, the ends of which engage a circumferential groove, $d^4$, in the nut D, so as to enable it to draw back the movable jaw C, as well as force it ahead. As shown in Fig. 8, one of the arms $e^5$ has a tooth or V-shaped projection, $d'$, at the end, which may engage a notch, $d^2$, in the bottom of the groove $d^4$ in the nut, and so forms a gage for retaining the nut in proper sliding position.

I am aware that a wrench-bar has been made oblong in transverse section and provided with sections of a screw-thread at opposite faces, the nut used therewith being grooved and destitute of a thread at two opposite points only in its circumference, and I do not claim such a construction as of my invention. In this construction the nut would be released from the thread and free to slide upon the bar at two points in its complete rotation.

I am not aware that a wrench-bar has ever been provided with sections of a thread at its four corners only, and a wrench-bar trapezoidal in its transverse section has never, to my knowledge, been used. This particular form of the bar, in connection with a nut grooved internally at unequal distances apart in its circumference, corresponding to the corners of the bar, is peculiarly advantageous, because the nut is released from the thread and free to slide at one point only in its complete rotation, and hence, when the sliding jaw is moved to operative position, the nut may be given almost a complete turn to clamp the jaw on the article to which it is applied without the nut becoming freed from the thread.

What I claim as my invention, and desire to secure by Letters Patent, is—

1. The combination, with a wrench-bar of trapezoidal transverse section, and the sides of which are therefore of unequal width and having portions of a screw-thread at the corners, of a movable jaw sliding thereon and a nut engaging the screw-threaded corners of the bar and grooved internally to permit the sliding of the nut when turned to proper position on the bar, the grooves in the nut being at unequal distances apart, in its circumference, corresponding to the arrangement of the sections of thread on the bar, whereby the nut will be free to slide upon the bar only when turned to one point in its rotation, substantially as herein described.

2. The combination, with a wrench-bar of polygonal transverse section and having screw-thread portions of unequal length at the several corners, of a movable jaw sliding thereon and a nut fitted to the screw-threaded corners of the bar and having internal longitudinal grooves which permit of the nut sliding on the bar when turned to proper position thereon, and which are of unequal widths corresponding to the unequal portions of thread at the several corners of the bar, whereby the nut is prevented from sliding on the bar except when at one point in its rotation, substantially as and for the purpose herein described.

3. The combination, with a wrench-bar of polygonal transverse section and having portions of a screw-thread at the corners, of a movable jaw sliding thereon, a nut fitted to the bar and grooved lengthwise at points in its circumference corresponding to the corners of the bar, and a rotary abutment in the movable jaw, against which the nut bears and by the adjustment of which the length of the movable jaw from the face to the point of bearing of the nut is increased or diminished, substantially as herein described.

4. The combination, with a wrench-bar of polygonal transverse section and having portions of a screw-thread at the corners, of a movable jaw sliding thereon, a nut arranged beyond the end of the jaw and internally grooved lengthwise to correspond to the corners of the bar and arranged to rotate completely around the bar, and a spring-actuated tooth or detent and a notch so arranged relatively to the nut as to engage one with the other when the nut is turned to a sliding position, and which serve to retain the nut against accidental turning, but will yield to permit the turning of the nut by hand throughout the whole or any part of a rotation, substantially as herein described.

5. The combination, with a wrench-bar of polygonal transverse section and having portions of a screw-thread at its corners, of a movable jaw and a collar, both surrounding and sliding on the bar and detachably connected by an arm lying along one of the flat sides of the bar, and a nut surrounding the bar and said arm and confined between said movable jaw and collar and grooved lengthwise internally to slide on the bar when turned to proper position, substantially as herein described.

6. The combination, with a wrench-bar of polygonal transverse section, having portions of a screw-thread at the corners, of a movable jaw sliding on the bar, a nut fitting the bar and grooved lengthwise internally to slide on the bar when turned to proper position, and a ring screwed into the movable jaw and forming an adjustable abutment, against which the nut bears, substantially as herein described.

7. The combination, with a wrench-bar having portions of a screw-thread at the corners and a movable jaw sliding thereon and provided with a screw-threaded ring, forming an adjustable abutment in the jaw, of a collar fitting the bar and having an arm lying along one side of the bar and engaging the movable jaw, and a nut confined between said abutment and collar fitting the screw-thread on the bar and grooved lengthwise internally to enable it to be slid on the bar when turned to proper position, substantially as herein described.

RUFUS B. MARKS.

Witnesses:
FREDK. HAYNES,
HENRY J. MCBRIDE.